United States Patent
Rosenberg (10) Patent No.: US 10,390,093 B1
(45) Date of Patent: *Aug. 20, 2019

(54) AUTOMATIC ON-DEMAND NAVIGATION BASED ON META-DATA BROADCAST WITH MEDIA CONTENT

(71) Applicant: Music Choice, Horsham, PA (US)

(72) Inventor: Jeremy C. Rosenberg, Havre de Grace, MD (US)

(73) Assignee: Music Choice, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,613

(22) Filed: Aug. 7, 2017

Related U.S. Application Data (63) Continuation of application No. 14/947,017, filed on Nov. 20, 2015, now abandoned, which is a
(Continued)

(51) Int. Cl.
*H04N 21/472* (2011.01)
*H04N 21/8358* (2011.01)
(Continued)

(52) U.S. Cl.
CPC . *H04N 21/47202* (2013.01); *H04N 21/42209* (2013.01); *H04N 21/4532* (2013.01); *H04N 21/482* (2013.01); *H04N 21/8358* (2013.01)

(58) Field of Classification Search
CPC ......... H04N 21/47202; H04N 21/4532; H04N 21/42209; H04N 21/482; H04N 21/8358
See application file for complete search history.

(56) References Cited

U.S. PATENT DOCUMENTS

| 4,127,796 A | 11/1978 | Henderson |
| RE29,997 E | 5/1979 | Den Toonder |

(Continued)

FOREIGN PATENT DOCUMENTS

| EP | 1 022 900 | 7/2000 |
| WO | 97/37492 | 10/1997 |

(Continued)

OTHER PUBLICATIONS

AudioRequest, MP3 Home Stereo Jukebox, ReQuest, Inc.-Company Info., and NSI WHOIS Search Results. Pages from the web site for www.request.com owned by ReQuest, Inc., Jun. 22, 2004, 6 pages.

(Continued)

*Primary Examiner* — Oschta I Montoya
(74) *Attorney, Agent, or Firm* — Rothwell, Figg, Ernst & Manbeck, P.C.

(57) ABSTRACT

A method for enabling a user to easily select and consume on-demand content is disclosed. In some embodiments, the method is performed by a communication device and includes the following steps: (1) receiving meta-data received by a set-top-box from a head-end system; (2) in response to receiving the meta-data, obtaining information associated with the received meta-data; (3) displaying one or more on-demand options in response to obtaining the information associated with the meta-data; (4) receiving user input indicating a user of the communication device has selected one of the displayed on-demand options; and (5) in response to receiving the user input, causing the set-top-box to (i) tune to an on-demand channel or (ii) display an on-demand menu.

1 Claim, 7 Drawing Sheets

Related U.S. Application Data continuation of application No. 14/167,509, filed on Jan. 29, 2014, now Pat. No. 9,197,937, which is a continuation of application No. 13/456,813, filed on Apr. 26, 2012, now abandoned.

(51) Int. Cl.
*H04N 21/482* (2011.01)
*H04N 21/45* (2011.01)
*H04N 21/422* (2011.01)

(56) References Cited

U.S. PATENT DOCUMENTS

| | | |
|---|---|---|
| 4,336,478 A | 6/1982 | Quilty et al. |
| 4,338,623 A | 7/1982 | Asmus et al. |
| 4,360,805 A | 11/1982 | Andrews et al. |
| 4,677,430 A | 6/1987 | Falkman et al. |
| 4,722,005 A | 1/1988 | Ledenbach |
| 4,760,455 A | 7/1988 | Nagashima |
| 4,799,156 A | 1/1989 | Shavit et al. |
| 4,823,386 A | 4/1989 | Dumbauld |
| 5,027,400 A | 6/1991 | Reimer et al. |
| 5,130,615 A | 7/1992 | George |
| 5,193,006 A | 3/1993 | Yamazaki |
| 5,235,680 A | 8/1993 | Bijangte |
| 5,315,448 A | 5/1994 | Ryan |
| 5,341,350 A | 8/1994 | Frank et al. |
| 5,355,302 A | 10/1994 | Martin et al. |
| 5,365,381 A | 11/1994 | Scheffler |
| 5,371,551 A | 12/1994 | Logan et al. |
| 5,418,654 A | 5/1995 | Scheffler |
| 5,420,838 A | 5/1995 | Maeda et al. |
| 5,481,296 A | 1/1996 | Cragun et al. |
| 5,534,911 A | 7/1996 | Levitan |
| 5,550,863 A | 8/1996 | Yurt et al. |
| 5,557,541 A | 9/1996 | Schulhof et al. |
| 5,559,949 A | 9/1996 | Reimer |
| 5,561,709 A | 10/1996 | Reimer et al. |
| 5,572,442 A | 11/1996 | Schulhof et al. |
| 5,585,866 A | 12/1996 | Miller et al. |
| 5,590,282 A | 12/1996 | Clynes |
| 5,592,511 A | 1/1997 | Schoen et al. |
| 5,596,373 A | 1/1997 | White et al. |
| 5,616,876 A | 4/1997 | Cluts |
| 5,617,565 A | 4/1997 | Augenbraun et al. |
| 5,629,867 A | 5/1997 | Goldman |
| 5,635,989 A | 6/1997 | Rothmuller |
| 5,636,276 A | 6/1997 | Brugger |
| 5,646,992 A | 7/1997 | Subler |
| 5,675,734 A | 10/1997 | Hair |
| 5,708,780 A | 1/1998 | Levergood et al. |
| 5,721,815 A | 2/1998 | Ottesen et al. |
| 5,726,909 A | 3/1998 | Krikorian |
| 5,734,719 A | 3/1998 | Tsevdos et al. |
| 5,734,853 A | 3/1998 | Hendricks et al. |
| 5,734,961 A | 3/1998 | Castille |
| 5,751,282 A | 5/1998 | Girard et al. |
| 5,751,806 A | 5/1998 | Ryan |
| 5,752,160 A | 5/1998 | Dunn |
| 5,753,844 A | 5/1998 | Matsumoto |
| 5,754,939 A | 5/1998 | Herz et al. |
| 5,761,606 A | 6/1998 | Wolzien |
| 5,761,607 A | 6/1998 | Gudesen |
| 5,761,662 A | 6/1998 | Dasan |
| 5,771,435 A | 6/1998 | Brown |
| 5,777,997 A | 7/1998 | Kahn |
| 5,781,889 A | 7/1998 | Martin et al. |
| 5,784,095 A | 7/1998 | Robbins et al. |
| 5,787,090 A | 7/1998 | Van Niekerk et al. |
| 5,790,935 A | 8/1998 | Payton |
| 5,793,980 A | 8/1998 | Glaser et al. |
| 5,808,223 A | 9/1998 | Kurakake et al. |
| 5,809,144 A | 9/1998 | Sirbu et al. |
| 5,809,246 A | 9/1998 | Goldman |
| 5,815,634 A | 9/1998 | Reimer et al. |
| 5,818,935 A | 10/1998 | Maa |
| 5,819,049 A | 10/1998 | Reietmann |
| 5,819,160 A | 10/1998 | Foladare et al. |
| 5,835,487 A | 11/1998 | Campanella |
| 5,841,979 A | 11/1998 | Schulhof et al. |
| 5,848,398 A | 12/1998 | Martin et al. |
| 5,861,906 A | 1/1999 | Dunn et al. |
| 5,878,141 A | 3/1999 | Daly et al. |
| 5,890,137 A | 3/1999 | Koreeda |
| 5,890,139 A | 3/1999 | Suzuki et al. |
| 5,899,699 A | 5/1999 | Kamiya |
| 5,899,980 A | 5/1999 | Wilf et al. |
| 5,900,830 A | 5/1999 | Scheffler |
| 5,905,865 A | 5/1999 | Palmer et al. |
| 5,913,204 A | 6/1999 | Kelly |
| 5,918,012 A | 6/1999 | Astiz et al. |
| 5,918,213 A | 6/1999 | Bernard et al. |
| 5,926,624 A | 7/1999 | Katz et al. |
| 5,930,765 A | 7/1999 | Martin et al. |
| 5,930,768 A | 7/1999 | Hooban |
| 5,931,901 A | 8/1999 | Wolfe et al. |
| 5,933,500 A | 8/1999 | Blatter et al. |
| 5,943,422 A | 8/1999 | Van Wie et al. |
| 5,944,608 A | 8/1999 | Reed et al. |
| 5,959,945 A | 9/1999 | Kleiman |
| 5,960,411 A | 9/1999 | Hartman et al. |
| 5,968,120 A | 10/1999 | Guedalia |
| 5,969,283 A | 10/1999 | Looney et al. |
| 5,970,474 A | 10/1999 | LeRoy et al. |
| 5,973,722 A | 10/1999 | Wakai et al. |
| 5,980,261 A | 11/1999 | Mino et al. |
| 5,986,692 A | 11/1999 | Logan et al. |
| 5,991,374 A | 11/1999 | Hazenfield |
| 5,991,737 A | 11/1999 | Chen |
| 6,011,761 A | 1/2000 | Inoue |
| 6,011,854 A | 1/2000 | Van Ryzin |
| 6,020,883 A | 2/2000 | Herz et al. |
| 6,021,432 A | 2/2000 | Sizer et al. |
| 6,025,868 A | 2/2000 | Russo |
| 6,038,591 A | 3/2000 | Wolfe et al. |
| 6,055,314 A | 4/2000 | Spies et al. |
| 6,055,560 A | 4/2000 | Mills et al. |
| 6,055,566 A | 4/2000 | Kikinis |
| 6,069,655 A | 5/2000 | Seeley et al. |
| 6,085,235 A | 7/2000 | Clarke et al. |
| 6,088,455 A | 7/2000 | Logan et al. |
| 6,088,722 A | 7/2000 | Herz et al. |
| 6,105,060 A | 8/2000 | Rothblatt |
| 6,111,882 A | 8/2000 | Yamamoto |
| 6,135,646 A | 10/2000 | Kahn et al. |
| 6,141,488 A | 10/2000 | Knudson et al. |
| 6,151,634 A | 11/2000 | Glaser et al. |
| 6,154,772 A | 11/2000 | Dunn et al. |
| 6,161,142 A | 12/2000 | Wolfe et al. |
| 6,175,840 B1 | 1/2001 | Chen et al. |
| 6,182,126 B1 | 1/2001 | Nathan et al. |
| 6,188,830 B1 | 2/2001 | Mercs et al. |
| 6,192,340 B1 | 2/2001 | Abecassis |
| 6,223,292 B1 | 4/2001 | Dean et al. |
| 6,226,030 B1 | 5/2001 | Harvey et al. |
| 6,226,618 B1 | 5/2001 | Downs et al. |
| 6,229,895 B1 | 5/2001 | Son et al. |
| 6,232,539 B1 | 5/2001 | Looney et al. |
| 6,233,389 B1 | 5/2001 | Barton et al. |
| 6,233,682 B1 | 5/2001 | Fritsch |
| 6,240,553 B1 | 5/2001 | Son et al. |
| 6,243,725 B1 | 6/2001 | Hempleman et al. |
| 6,246,672 B1 | 6/2001 | Lumelsky |
| 6,248,946 B1 | 6/2001 | Dwek |
| 6,249,810 B1 | 6/2001 | Kiraly |
| 6,253,235 B1 | 6/2001 | Estes |
| 6,253,237 B1 | 6/2001 | Story et al. |
| 6,262,772 B1 | 7/2001 | Shen et al. |
| 6,263,505 B1 | 7/2001 | Walker et al. |
| 6,271,455 B1 | 8/2001 | Ishigaki et al. |
| 6,279,040 B1 | 8/2001 | Ma et al. |
| 6,286,139 B1 | 9/2001 | Decinque |
| 6,289,165 B1 | 9/2001 | Abecassis |
| 6,305,020 B1 | 10/2001 | Horaty et al. |

(56) References Cited

U.S. PATENT DOCUMENTS

| | | |
|---|---|---|
| 6,317,784 B1 | 11/2001 | Mackintosh et al. |
| 6,324,217 B1 | 11/2001 | Gordon |
| 6,330,595 B1 | 12/2001 | Ullman et al. |
| 6,330,609 B1 | 12/2001 | Garofalakis et al. |
| 6,338,044 B1 | 1/2002 | Cook et al. |
| 6,341,375 B1 | 1/2002 | Watkins |
| 6,349,339 B1 | 2/2002 | Williams |
| 6,351,469 B1 | 2/2002 | Otani et al. |
| 6,360,368 B1 | 3/2002 | Chawla |
| 6,366,791 B1 | 4/2002 | Lin et al. |
| 6,369,851 B1 | 4/2002 | Marflak et al. |
| 6,378,129 B1 | 4/2002 | Zetts |
| 6,385,596 B1 | 5/2002 | Wiser et al. |
| 6,389,467 B1 | 5/2002 | Eyal |
| 6,393,430 B1 | 5/2002 | Van Ryzin |
| 6,418,421 B1 | 7/2002 | Hurtado et al. |
| 6,434,621 B1 | 8/2002 | Pezzillo et al. |
| 6,434,747 B1 | 8/2002 | Khoo et al. |
| 6,445,306 B1 | 9/2002 | Trovato |
| 6,446,080 B1 | 9/2002 | Van Ryzin et al. |
| 6,446,130 B1 | 9/2002 | Grapes |
| 6,448,987 B1 | 9/2002 | Easty et al. |
| 6,452,609 B1 | 9/2002 | Katinsky et al. |
| 6,473,792 B1 | 10/2002 | Yavitz et al. |
| 6,481,012 B1 | 11/2002 | Gordon et al. |
| 6,490,728 B1 | 12/2002 | Kitazato et al. |
| 6,502,137 B1 | 12/2002 | Peterson et al. |
| 6,505,240 B1 | 1/2003 | Blumenau |
| 6,507,727 B1 | 1/2003 | Henrick |
| 6,526,411 B1 | 2/2003 | Ward |
| 6,550,011 B1 | 4/2003 | Sims, III |
| 6,580,870 B1 | 6/2003 | Kanazawa et al. |
| 6,587,127 B1 | 7/2003 | Leeke et al. |
| 6,587,837 B1 | 7/2003 | Spagna et al. |
| 6,597,891 B2 | 7/2003 | Tantawy et al. |
| 6,631,522 B1 | 10/2003 | Erdelyi |
| 6,637,032 B1 | 10/2003 | Reimer et al. |
| 6,694,090 B1 | 2/2004 | Lewis et al. |
| 6,704,491 B1 | 3/2004 | Revis |
| 6,748,427 B2 | 6/2004 | Drosset et al. |
| 6,766,357 B1 | 7/2004 | Fandozzi |
| 6,766,528 B1 | 7/2004 | Kim et al. |
| 6,782,550 B1 | 8/2004 | Cao |
| 6,785,707 B2 | 8/2004 | Teeple |
| 6,789,106 B2 | 9/2004 | Eyer |
| 6,792,280 B1 | 9/2004 | Hori et al. |
| 6,792,615 B1 | 9/2004 | Rowe et al. |
| 6,795,711 B1 | 9/2004 | Sivula |
| 6,796,555 B1 | 9/2004 | Blahut |
| 6,834,308 B1 | 12/2004 | Ikezoye et al. |
| 6,842,604 B1 | 1/2005 | Cook |
| 6,856,550 B2 | 2/2005 | Kato et al. |
| 6,865,550 B1 | 3/2005 | Cok |
| 6,868,440 B1 | 3/2005 | Gupta et al. |
| 6,898,800 B2 | 5/2005 | Son et al. |
| 6,915,529 B1 | 7/2005 | Suematsu et al. |
| 6,925,489 B1 | 8/2005 | Curtin |
| 6,928,655 B1 | 8/2005 | Omoigui |
| 6,933,433 B1 | 8/2005 | Porteus et al. |
| 6,952,221 B1 | 10/2005 | Holtz et al. |
| 6,965,770 B2 | 11/2005 | Walsh et al. |
| 6,978,310 B1 | 12/2005 | Rodriguez et al. |
| 6,985,694 B1 | 1/2006 | De Bonet |
| 7,020,888 B2 | 3/2006 | Reynolds et al. |
| 7,024,678 B2 | 4/2006 | Gordon et al. |
| 7,028,082 B1 | 4/2006 | Rosenberg et al. |
| 7,062,272 B2 | 6/2006 | Grilli et al. |
| 7,065,287 B1 | 6/2006 | Heredia et al. |
| 7,073,189 B2 | 7/2006 | McElhatten et al. |
| 7,076,561 B1 | 7/2006 | Rosenberg et al. |
| 7,111,099 B2 | 9/2006 | Alexander et al. |
| 7,133,924 B1 | 11/2006 | Rosenberg et al. |
| 7,140,032 B2 | 11/2006 | Dew et al. |
| 7,149,471 B1 | 12/2006 | Arisawa et al. |
| 7,155,674 B2 | 12/2006 | Breen et al. |
| 7,181,538 B2 | 2/2007 | Tam et al. |
| 7,207,006 B1 | 4/2007 | Feig et al. |
| 7,249,186 B1 | 7/2007 | Sitaraman et al. |
| 7,281,035 B2 | 10/2007 | Ihara et al. |
| 7,293,275 B1 | 11/2007 | Krieger et al. |
| 7,302,253 B2 | 11/2007 | Moody et al. |
| 7,305,698 B1 | 12/2007 | Tanigawa et al. |
| 7,320,025 B1 | 1/2008 | Steinberg et al. |
| 7,321,923 B1 | 1/2008 | Rosenberg et al. |
| 7,325,043 B1 | 1/2008 | Rosenberg et al. |
| 7,325,245 B1 | 1/2008 | Clapper |
| 7,343,179 B1 | 3/2008 | Theis et al. |
| 7,464,394 B1 | 12/2008 | Gordon et al. |
| 7,555,539 B1 | 6/2009 | Rosenberg et al. |
| 7,600,686 B2 | 10/2009 | Morris |
| 7,617,295 B1 | 11/2009 | Farber et al. |
| 7,668,538 B2 | 2/2010 | Rosenberg et al. |
| 7,711,838 B1 | 5/2010 | Boulter et al. |
| 7,735,106 B2 | 6/2010 | LaRocca et al. |
| 7,869,580 B2 | 1/2011 | Tagawa et al. |
| 7,870,592 B2 | 1/2011 | Hudson et al. |
| 7,962,572 B1 | 6/2011 | Farber et al. |
| 7,986,977 B2 | 7/2011 | Rosenberg et al. |
| 8,024,766 B2 | 9/2011 | Addington |
| 8,060,055 B2 | 11/2011 | Huang |
| 8,098,811 B2 | 1/2012 | Singh |
| 8,112,494 B2 | 2/2012 | Maghraby |
| 8,166,133 B1 | 4/2012 | Steinberg et al. |
| 8,170,194 B2 | 5/2012 | Shen et al. |
| 8,245,269 B2 * | 8/2012 | Schiller .............. H04N 7/17309 725/135 |
| 8,260,271 B2 | 9/2012 | Rosenberg et al. |
| 8,265,237 B2 | 9/2012 | Reynolds et al. |
| 8,291,452 B1 | 10/2012 | Yong et al. |
| 8,381,252 B2 | 2/2013 | Young |
| 8,526,579 B2 | 9/2013 | Thomas |
| 8,533,175 B2 | 9/2013 | Roswell |
| 8,639,228 B2 | 1/2014 | Rosenberg et al. |
| 8,677,416 B2 | 3/2014 | Arora |
| 8,677,430 B2 | 3/2014 | Mitsuji et al. |
| 8,700,795 B2 | 4/2014 | Boulter et al. |
| 8,868,481 B2 | 10/2014 | Wei et al. |
| 9,197,937 B1 | 11/2015 | Rosenberg |
| 9,351,045 B1 | 5/2016 | Steinberg et al. |
| 9,414,121 B1 | 8/2016 | Farber et al. |
| 2001/0025259 A1 | 9/2001 | Rouchon |
| 2001/0032312 A1 | 10/2001 | Runje et al. |
| 2001/0042107 A1 | 11/2001 | Palm |
| 2001/0044851 A1 | 11/2001 | Rothman et al. |
| 2001/0049826 A1 | 12/2001 | Wilf |
| 2002/0002039 A1 | 1/2002 | Qureshey et al. |
| 2002/0021708 A1 | 2/2002 | Ishiai |
| 2002/0023163 A1 | 2/2002 | Frelechoux et al. |
| 2002/0023164 A1 | 2/2002 | Lahr |
| 2002/0023166 A1 | 2/2002 | Bar-Noy et al. |
| 2002/0032019 A1 | 3/2002 | Marks et al. |
| 2002/0032728 A1 | 3/2002 | Sako et al. |
| 2002/0038359 A1 | 3/2002 | Ihara et al. |
| 2002/0042913 A1 | 4/2002 | Ellis et al. |
| 2002/0046084 A1 | 4/2002 | Steele et al. |
| 2002/0056117 A1 | 5/2002 | Hasegawa et al. |
| 2002/0056118 A1 | 5/2002 | Hunter et al. |
| 2002/0058521 A1 | 5/2002 | Yamada et al. |
| 2002/0059621 A1 | 5/2002 | Thomas et al. |
| 2002/0062261 A1 | 5/2002 | Mukai |
| 2002/0071658 A1 | 6/2002 | Marko et al. |
| 2002/0073425 A1 | 6/2002 | Arai et al. |
| 2002/0078456 A1 | 6/2002 | Hudson et al. |
| 2002/0083148 A1 | 6/2002 | Shaw et al. |
| 2002/0087402 A1 | 7/2002 | Zustak |
| 2002/0091762 A1 | 7/2002 | Sohn et al. |
| 2002/0108115 A1 | 8/2002 | Palmer |
| 2002/0138630 A1 | 9/2002 | Solomon et al. |
| 2002/0143782 A1 | 10/2002 | Headings et al. |
| 2002/0152278 A1 | 10/2002 | Pontenzone et al. |
| 2002/0161797 A1 | 10/2002 | Gallo et al. |
| 2002/0161909 A1 | 10/2002 | White |
| 2002/0194260 A1 | 12/2002 | Headley et al. |
| 2002/0194619 A1 | 12/2002 | Chang et al. |

(56) References Cited

U.S. PATENT DOCUMENTS

| | | |
|---|---|---|
| 2003/0023975 A1 | 1/2003 | Schrader et al. |
| 2003/0050058 A1 | 3/2003 | Walsh et al. |
| 2003/0050837 A1 | 3/2003 | Kim |
| 2003/0097338 A1 | 5/2003 | Mankovich et al. |
| 2003/0120500 A1 | 6/2003 | Deeds et al. |
| 2003/0126595 A1 | 7/2003 | Sie |
| 2003/0135464 A1 | 7/2003 | Mourad et al. |
| 2003/0153302 A1 | 8/2003 | Lewis et al. |
| 2003/0162571 A1 | 8/2003 | Chung |
| 2003/0182184 A1 | 9/2003 | Strasnick et al. |
| 2003/0188313 A1 | 10/2003 | Ellis et al. |
| 2003/0192060 A1 | 10/2003 | Levy |
| 2004/0255336 A1 | 12/2004 | Logan et al. |
| 2005/0060745 A1 | 3/2005 | Riedl et al. |
| 2005/0278761 A1 | 12/2005 | Gonder et al. |
| 2006/0026639 A1 | 2/2006 | Potrebic et al. |
| 2006/0173974 A1 | 8/2006 | Tang |
| 2006/0194626 A1 | 8/2006 | Anttila |
| 2006/0199575 A1 | 9/2006 | Moore et al. |
| 2006/0235723 A1 | 10/2006 | Millard |
| 2007/0060112 A1* | 3/2007 | Reimer ............ G06F 17/30026 455/414.2 |
| 2007/0143493 A1 | 6/2007 | Mullig et al. |
| 2007/0168429 A1 | 7/2007 | Apfel et al. |
| 2008/0086742 A1* | 4/2008 | Aldrey .................. H04H 60/33 725/24 |
| 2009/0002335 A1 | 1/2009 | Chaudhri et al. |
| 2009/0028331 A1* | 1/2009 | Millar ................ H04N 7/17318 380/255 |
| 2009/0210905 A1* | 8/2009 | Maruyama ......... H04N 5/44543 725/40 |
| 2009/0327894 A1* | 12/2009 | Rakib .................... G11B 27/34 715/719 |
| 2010/0119208 A1* | 5/2010 | Davis ..................... H04N 5/765 386/291 |
| 2012/0096499 A1* | 4/2012 | Dasher ............... H04N 21/4223 725/87 |
| 2012/0158524 A1 | 6/2012 | Hintz et al. |
| 2013/0332962 A1 | 12/2013 | Moritz et al. |
| 2014/0122593 A1 | 5/2014 | Bachman et al. |

FOREIGN PATENT DOCUMENTS

| | | |
|---|---|---|
| WO | 99/10822 | 3/1999 |
| WO | 99/17230 | 4/1999 |
| WO | 99/39466 | 8/1999 |
| WO | 99/48296 | 9/1999 |
| WO | 00/07368 | 2/2000 |
| WO | 0019662 | 4/2000 |
| WO | 01/036064 | 5/2001 |
| WO | 01/38993 | 5/2001 |
| WO | 01/79964 | 10/2001 |

OTHER PUBLICATIONS

SonicNet: The Online Music Network, http:/web.archive.org/web/19991013143923/http://sonicnet.com/, Oct. 13, 1999, 6 pages.
Trowsdale, J., "The ntl guide to digital radio for dummies," http://www.ntl.com/locales/gb/en/guides/dummies/default.asp, Aug. 13, 2002, 1 page.
Deutsche Telekom AG, "Digital Radio," http://www.telekom.de/dtag/ipl1/cda/level3_a/0,3680,10077,00.html, Aug. 18, 2000, 1 page.
"The Eureka 147 Consortium," http://eurekadab.org/eureka_147_consortium.htm, Aug. 14, 2000, 3 pages.
Clark D. (2000). "Click Radio to put a DJ in your PC." WSJ Interactive Edition.
ClickRadio granted first interactive radio license by universal music group. 3 pages. From the web site at www.clickradio.com, printed Apr. 26, 2000.
Gordon, C. (2000). "Click radio sidesteps competition with music licensing deals." Atnewyork.com.
Press Release. (Dec. 13, 2000). "Phillips showcases click radio on digital set-top at western show 2000." Phillips.
Bower (1998). "Digital Radio—A Revolution for In-Car Entertainment" Proc. NavPos Automative '98 Conf. 2(5-8): 40-51.
Radio Authority (1999). Digital Radio Fact Sheet No. 4 http://www.radioauthority.org.uk/Information/Fact.sub.--Sheets/fs4.htm.
ICTV (2000). Digital Broadband System Press Release: 1-11.
Loeb, S., "Architecting Personalized Delivery of Multimedia Information", Communications of the ACM, Dec. 1992, vol. 35, No. 12, pp. 39-48.
"Blue Note Radio," Now Playing on a Computer Screen Near You. EMI's Blue Note Records Expands New Media Initiative with RadioWave.com, Press Release Newswire Association, Inc., Apr. 4, 2000, 2 pages.
"Global Media Announces Launch of Independent Internet Radio station," News Release, Feb. 1, 1999, 2 pages.
Olenick, Doug, "Internet Radio Listeners Unchained From Their PCs," Oct. 25, 1999. Twice Computer Technology, 1 page.
"Platinum Entertainment and Liquid Audio Join Forces to Offer Extensive Music Catalog via Digital Downloads", Press Release, Jul. 15, 1998, 2 pages.
"Set-top box for television that reads your mind," Financial Times Limited, Dec. 30, 1998, 1 page.
"Sonicbox and Microsoft Bring Windows Media Internet Radio to the Home Stereo," Dec. 7, 1999 Microsoft Press Release, 3 pages.
Partyka, Jeff , "Sonicbox brings Net radio into your living room," Oct. 12, 1999. CNN.com, 3 pages.
Pekowsky, S. and R. Jaeger The set-top box as 'multi-media terminal';-Consumer Electronics, IEEE Transactions on 1998, pp. 1-8.
"Tune into Yahoo! Radio," Yahoo Media Relations Press Release, Yahoo! teams up with Broadcast.com and Spinner.com to Provide 10 stations of Audio Programming, May 11, 1999, 2 pages.
"WebRadio.com Signs on as Liquid Music Network Affiliate Offering Liquid Audio Digital Downloads," Business Wire, Inc., Sep. 1, 1999, 2 pages.
http://launch.yahoo.com, "Music on Yahoo", 2 pages, Jun. 25, 2004.
King, "Tune on, Tune in, Drop Cash" Dec. 8, 2000, Wired News, 4 pages.
LaFrance, "Thinking Globally with a web-based radio station vying for listeners around the world, homegrown internet company fastband aims to shake up the music world", Times Picayune, Nov. 4, 1999, 2 pages.
Rajapakshe, H. et al., "Video on Demand," Jun. 1995, pp. 1-15.
Time Warner Cable, Pegasus, "The ISA Tutorial," Version 1.0, Sep. 13, 2003, 73 pages.
U.S. Appl. No. 14/163,554, filed Jan. 24, 2014.
U.S. Appl. No. 14/153,872, filed Jan. 13, 2015.
UniView Technologies Now in Yahoo!'s Multicast Affiliate Program, Press Release Newswire Association, Inc., Oct. 19, 1999, 2 pages.
Welz, Gary, Integrated Streaming Technologies, Oct. 30, 1996, www.webdeveloper.cm/multimedi/multimedi.sub.--web/96/mw961030.html.
Yahoo Offers one-stop shop for e-music, Milwaulkee Journal Sentinel (Wisconsin), Aug. 25, 1999, 1 page.
Reply to Non-Final Office Action in U.S. Appl. No. 14/153,872 , dated Dec. 11, 2015, 9 pages.
Reply to Final Office Action in U.S. Appl. No. 14/163,554, dated Feb. 17, 2016.
Bryhni et al., "On-demand Regional Television Over the Internet," Nov. 1996, ACM Multimedia, Proceedings of the 4th ACM International Conference on Multimedia, 9 pages.
Bove et al., "Hyperlinked Television Research at the MIT Media Laboratory," May 2000, IBM Systems Journal, vol. 39, Nos. 3 & 4, 9 pages.
Cosmas et al., "CustomTV with MPEG-4 and MPEG-7," Dec. 6, 1999, IEE Electronics Communications: Interactive Television, Colloquium, 7 pages.
"Music Choice Europe, A Leader in Digital Music Services," Sep. 6, 2000, Investec Henderson Crosthwaite Securities, 47 pages.
"Music Choice Prospectus 2000," Sep. 2000, Investec Henderson Crosthwaite Securities, 95 pages.

(56) References Cited

OTHER PUBLICATIONS

"NDS to Showcase Interactive Applications that Transform Living Rooms into Digital Interactive Theaters At NAB 2000," Apr. 9, 2000, NDS Group plc. Business Wire, 3 pages.
Music Choice Europe, "Music Choice Chooses NDS as its Digital TV Technology Partner," Jul. 2000, 2 pages.
"NDS Delivers Sophisticated Interactive Application to Music Choice Europe," May 10, 2001, NDS Group plc. Business Wire, 3 pages.
"NDS Group plc Reports Full Year Revenues Up 35% and Operating Income Growth of 69% Plus Major Contract Wins in Fourth Quarter," Aug. 6, 2001, NDS Group plc, 15 pages.
NDS Website (http://web.archive.org/web/20000824140133/http://www.nds.com/products/broad_products/nds_broadcast/prod_value@tv.htm). Aug. 24, 2000, 7 pages.
Doherty et. al., "Detail-on-Demand Hypervideo," Nov. 2-8, 2003, FX Palo Alto Laboratory, 2 pages.
Krikke, "Streaming Video Transforms the Media Industry," Jul.-Aug. 2004, IEEE Computer Society, 7 pages.
Atzori et al., "Multimedia Information Broadcasting Using Digital TV Channels," Sep. 1997, IEEE Transactions on Broadcasting, vol. 43, No. 3, 10 pages.
Brunheroto et al., "Issues in Data Embedding and Synchronization for Digital Television", Jul. 30-Aug. 2, 2000, IEEE Publication, 6 pages.
Coden et al., "Speech Transcript Analysis for Automatic Search," Jan. 3-6, 2001, IEE Proceedings of the 34$^{th}$ Hawaii International Conference on System Science, 11 pages.
Dakss, Jonathan, "HyperActive: An Automated Tool for Creating Hyperlinked Video," Sep. 1999, Published thesis by the Massachusetts Institutes of Technology, 100 pages.
Jacobs, Bruce, "Transport B for Broadcasters: Boon or Bane?," Feb. 8-10, 2001, Twin Cities Public Television, Inc., 9 pages.
"Information Technology—Generic Coding of Moving Pictures and Associated Audio Information: Video," Feb. 2000, International Telecommunication Union (ITU-T), 220 pages.
Chang et al., "Overview of the MPEG-7 Standard," Jun. 2001, IEEE Transactions on Circuits and Systems for Video Technology, vol. 11, No. 6, 8 pages.
Yao et al., "The Development of a Video Metadata Authoring and Browsing System in XML," Dec. 2000, Australian Computer Society, Inc. Visualisation 2000, Pan-Sydney Workshop on Visual Information Processing, 8 pages.
Bainbridge et al., "Towards a Digital Library of Popular Music," Aug. 1, 1999, ACM, 9 pages.
Hacker, Scot, "MP3: The Definitive Guide," Mar. 2000, O'Reilly Publishing, 378 pages.
Jacso et al., "Music to Your Ears (and Eyes)," Jun.-Jul. 1996, Database; ABI/Inform Global, 10 pages.
Jermey, Jonathan , "Locating Files on Computer Disks," Apr. 2001, The Indexer, vol. 22, No. 3, 3 pages.
Lippman et al., "Media Banks: Entertainment and the Internet," Apr. 4, 1996, IBM Systems Journal, vol. 35, Nos. 3&4, 20 pages.
Loudeye Website, 1999 - 2000, Loudeye Technologies. Archive.org, 2 pages.
Marrin et al., "Steerable Media: Interactive Television via Video Synthesis," Feb. 19-22, 2001, ACM, 10 pages.
Packham et al., "Transport of Context-Based Information in Digital Audio Data," Sep. 22-25, 2000, AES 109th Convention, 14 pages.
Papadakis et al., "Technical Note Design and Architectural of a Digital Music Library on the Web," Jan. 2001, The New Review of Hypermedia and Multimedia, 12 pages.
Vilain et al., "Use Cases and Scenarios in the Conceptual Design of Web Applications," Feb. 2000, PUC-Rio Inf. MCC 12/00, 12 pages.
Zerod, Richard, "The Evolution: From Car Audio to Digital Mobile Multimedia," Feb. 24-27, 1997, SAE Technical Paper Series—1997 International Congress & Exposition, 9 pages.
Letter Agreement addressed to Music Choice Europe Limited, dated Sep. 26, 2000, 8 pages.
Defendants Stingray Digital Group Inc.'S and Stingray Music USA, Inc.'s ("Stingray") Invalidity Contentions Pursuant to Patent L.R. 3-3, Nov. 28, 2016, 25 pages.
Appendix A to Stingray's Invalidity Contentions, dated Nov. 28, 2016, 245 pages.
Appendix C to Stingray's Invalidity Contentions, dated Nov. 28, 2016, 770 pages.
Appendix E to Stingray's invalidity Contentions, dated Nov. 28, 2016, 968 pages.
U.S. Appl. No. 15/231,152, filed Aug. 8, 2016, 47 pages.
Non-Final Office Action issued in U.S. Appl. No. 14/922,597, dated Aug. 23, 2016, 17 pages.
Final Office Action issued in U.S. Appl. No. 14/922,597, dated Mar. 7, 2017, 22 pages.
Petition for Inter Parties Review U.S. Pat. No. 7,320,025, IPR Case No. IPR2017-00888, 53 pages, Mar. 17, 2013.
Declaration of Michael Shamos, Petition for Inter Parties Review U.S. Pat. No. 7,320,025, IPR Case No. IPR2017-00888, dated Mar. 7, 2017, 56 pages.
Hallier, J. et al., "Multimedia Broadcasting to mobile, portable and fixed Receivers using the Eureka 148 Digital Audio Broadcasting System," 5th IEEE International Symposium on Personal, Indoor and Mobile Radio Communications, Wireless Networks—Catching the Mobile Future, Sep. 18-23, 1994, 11 pages.
Petition for Inter Parties Review U.S. Pat. No. 9,351,045, IPR Case No. IPR2017-1191, dated Mar. 30, 2017, 62 pages.
Declaration of Michael Shamos, Petition for Inter Parties Review U.S. Pat. No. 9,351,045, IPR Case No. IPR2017-1191, dated Mar. 30, 2017, 135 pages.
Petition for Inter Parties Review U.S. Pat. No. 9,414,121, IPR Case No. IPR2017-1450, dated May 18, 2017, 79 pages.
Declaration of Michael Shamos, Petition for Inter Parties Review U.S. Pat. No. 9,414,121, IPR Case No. IPR2017-1450, dated May 18, 2017, 127 pages.
U.S. Appl. No. 15/485,417, filed Apr. 12, 2017, 69 pages.
U.S. Appl. No. 60/377,963 (McElhatten-189 provisional application), filed May 3, 2002, 85 pages.
Music Choice's Local Patent Rule 3-1 Cover Pleading Submission in *Music Choice v. Stingray Digital Group Inc.*, Case No. 2:16-CV-0586-JRG-RSP (E.D. Tex.), dated Sep. 12, 2016, 5 pages.
Comaromi, J., et al. (Eds.)., "DDC 20: Dewey Decimal Classification," 20$^{th}$ Ed., 1989, 27 pages.
"Launch Media and iBeam Team Up to Take on Heavyweight Napster on College Campus Circuit," digitalcoastdaily.com, Jun. 19, 2000, 10 pages.
Cosmas, J., et al., "CustomTV with MPEG-4 and MPEG-7," Institution of Electrical Enginners (1999), 7 pages.
Gonze, L., "A survey of playlist formats," Nov. 17, 2003, 12 pages.
Amended Invalidity Contentions case No. 2:16-cv-586-JRG-RSP (Apr. 13, 2017), 613 pages.
Dougherty, Advertising Music Channel on Cable TV, The New York Times, Jun. 1981, 2 pages.
Yarrow, Cable TV Moves to the Music, The New York Times, Jul. 1982, 2 pages.
CFT2200 User Guide, General Instrument 1999, 63 pages.
Information Disclosure Statement, Dec. 2006, 3 pages.
DR500 User Guide for the DMX Digital Audio Satellite Receiver, DMX, Rev. C (Oct. 1994), 47 pages.
Michaels, F., WBEB Philly Extends Its Reach Via Site, Billboard, 88 (Sep. 30, 2000) ("Billboard"), 2 pages.
Dely, L., WBEB Live Links Web and On-air Ads, RadioWorld.com (May 15, 2000) ("RadioWorld") (available at http://www.radioworld.com/news-and-business/0002/wbeb-live-links-web-and-onair-ads/304743), 7 pages.
Kerschbaumer, K., Philly FM creates novel Web future, BroadcastingCable.com (Jun. 4, 2000) ("Broadcasting Cable") (available at http://www.broacastingcable.com/news/news-articles/philly-fm-creates-novel-web-future/86828), 6 pages.
Stingray Digital Group Answer to the Third Amended Complaint (Apr. 7, 2017), 230 pages.
AudioSense Corporation, Have you Seen Radio Lately, 6 pages.
RadioWave.com,Inc., "It's on-line . . . It's Interactive . . . It's the next wave of radio!" (1998), 2 pages.

(56) References Cited

OTHER PUBLICATIONS

RadioWave.com,Inc., "It's on-line . . . It's Interactive . . . It's the next wave of radio!," Install Disk (1998), 2 pages.
ClickZ, RadioWave.com and Enco Systems Establish Alliance, Oct. 19, 1998, 1 page.
Lyster, "Motorola Unit Fine-Tuning Internet Radio," Investor's Business Daily, Nov. 25, 1998, 1 page.
Hiber, "Internet Radio Ratings Coming Soon From Arbitron, RadioWave.com," Radio@Large (Dec. 1998), 1 page.
Gavin.com, "Today's Highlights," www.gavin.com/index.shtml (Dec. 25, 1998), 1 page.
Gavin.com, "Secure Digital Music Initiative Begins Portable Device Working Group," www.gavin.com/news/990305/sdmi.shtml (Mar. 5, 1999), 2 pages.
SEC Form S-1, Broadcast.com Inc. Part 1 (May 1998), 176 pages.
SEC Form S-1, Broadcast.com Inc. Part 2 (May 1998), 175 pages.
Prospectus, Broadcast.com (Jul. 16, 1998), 98 pages.
IPR2017-00888 Patent Owner Preliminary Response, (Jun. 2017), 48 pages.
IPR2017-00888 Institution Decision, (Sep. 2017), 24 pages.
IPR2017-00888 Patent Owner Response, (Jan. 2018), 83 pages.
IPR2017-00888 Ex. 2001 (1st Russ Declaration), (Jan. 2018), 55 pages.
IPR2017-00888 Ex. 2007 (2nd Russ Declaration), (Jan. 2018), 53 pages.
IPR2017-00888—Petitioner's Reply, (Apr. 16, 2018), 33 pages.
IPR2017-00888 Ex. 1009 Mar. 14, 2018 Deposition of Dr. Russ, 128 pages.
IPR2017-00888 Ex. 1010 Reply Declaration of Dr. Shamos, (Apr. 16, 2018), 43 pages.
IPR2017-00888 Ex. 1011 Excerpt from Websters, (1999), 4 pages.
IPR2017-00888 Ex. 1012 Excerpt from The Oxford English Dictionary (2d Ed.), (1989), 3 pages.
IPR2017-01191 Patent Owner Preliminary Response, (Jul. 2017), 42 pages.
IPR2017-01191 Institution Decision, (Oct. 2017), 25 pages.
IPR2017-01191 Patent Owner Response, (Jan. 2018), 68 pages.
IPR2017-01191 Ex. 2109 (1st Russ Declaration), (Jan. 2018), 27 pages.
IPR2017-01191 Ex. 2112 (2nd Russ Declaration), (Jan. 2018), 52 pages.
IPR2017-01191—Petitioner's Reply, (Apr. 16, 2018), 32 pages.
IPR2017-01191 Ex. 1020 Mar. 14, 2018 Deposition of Dr. Russ, 93 pages.
IPR2017-01191 Ex. 1021 Reply Declaration of Dr. Shamos, (Apr. 16, 2018), 34 pages.
IPR2017-01450 Patent Owner Preliminary Response, (Aug. 28, 2017), 37 pages.
IPR2017-01450 Ex. 2001 Claim Construction Order, (Jul. 6, 2017), 52 pages.
IPR2017-01450 Institution Decision, (Oct. 27, 2017), 35 pages.
IPR2017-01450 Patent Owner Response, (Mar. 5, 2018), 39 pages.
IPR2017-01450 Ex. 2002 Declaration of Dr. Russ, (Mar. 5, 2018), 40 pages.
IPR2017-01450 Ex. 2003 Shamos Deposition Transcript, (Feb. 14, 2018), 65 pages.
IPR2017-01450 Ex. 2004 Shamos Deposition Transcript, (Feb. 13, 2018), 141 pages.
IPR2017-01450 Ex. 2005 Illustrated Dictionary of Electronics, (1999), 6 pages.
IPR2017-01450 Ex. 2006 The Educational Technology Telecommunications Dictionary, (1991), 3 pages.
IPR2017-01450 Ex. 2007 Comprehensive Dictionary of Electrical Engineering, (1999), 5 pages.
IPR2017-01450 Ex. 2008 Dictionary of Information Technology (Third Edition), (1989), 4 pages.
IPR2017-01450 Ex. 2009 Desktop Dictionary of Information Systems Technology, (1989), 6 pages.
IPR2017-01450 Ex. 2010 File Wrapper, (Jun. 2011-Aug. 2014), 183 pages.
Portions of the File history of U.S. Appl. No. 11/002,181 (138), filed Dec. 2006-Aug. 2007, 61 pages.
Portions of the File history of U.S. Appl. No. 11/963,164 (162), filed Dec. 2010-Dec. 2011, 48 pages.
Portions of the File history of U.S. Appl. No. 13/453,826 (190), filed Sep. 2013, 11 pages.
Portions of the File history of U.S. Appl. No. 14/153,872, filed Sep. 2015-Dec. 2015, 20 pages.
Portions of the File history of U.S. Appl. No. 14/635,483, (now U.S. Pat. No. 9,351,045), filed Aug. 2015-Jan. 2016, 20 pages.
Portions of the File history of U.S. Appl. No. 15/162,259, filed Sep. 2016, 6 pages.
Portions of the File history of U.S. Appl. No. 11/002,205, (now U.S. Pat. No. 7,617,295), (136), filed May 2008-Jun. 2009, 56 pages.
Portions of the File history of U.S. Appl. No. 12/605,580, (now U.S. Pat. No. 7,962,572), (168), filed Aug. 2010-Feb. 2011, 17 pages.
Portions of the File history of U.S. Appl. No. 13/157,386, filed Oct. 2013, 15 pages.
Portions of the File history of U.S. Appl. No. 14/163,554, (now U.S. Pat. No. 9,414,121), filed Jul. 2014-Jun. 2016, 72 pages.
Portions of the File history of U.S. Appl. No. 15/231,152, filed Jul. 2017, 35 pages.
U.S. Appl. No. 15/677,236, filed Aug. 2017, 30 pages.
Final Office Action issued in U.S. Appl. No. 15/231,152 dated May 15, 2018, 19 pages.
Non-Final Office Action issued in U.S. Appl. No. 15/677,236 dated Jun. 5, 2018, 6 pages.
IPR2017-01450—Petitioner's Reply, (May 18, 2018), 39 pages.
IPR2017-01450 Ex. 1016 Reply Declaration of Dr. Shamos, (May 18, 2018), 26 pages.
IPR2017-01450 Ex. 1017 U.S. Pat. No. 7,783,722, (Aug. 24, 2010), 49 pages.
IPR2017-01450 Ex. 1018 U.S. Pat. No. 7,275,256, (Sep. 25, 2007), 34 pages.
IPR2017-01450 Ex. 1019 Deposition Transcript of Dr. Russ, (Apr. 20, 2018), 89 pages.
IPR2017-01450 Ex. 1020 Definition of "Analog Data", https://www.techopedia.com/definition/24871/analog-data, Exhibit 3 to the Apr. 20, 2018 Deposition of Dr. Russ, 4 pages.
IPR2017-01450 Ex. 1021 Definition of "Analog Data", https://study.com/academy/lesson/analog-data-vs-digital-data.html, Exhibit 4 to the Apr. 20, 2018 Deposition of Dr. Russ, 3 pages.
IPR2017-01450 Ex. 1022 U.S. Patent Publication No. 2008/0101415, (May 1, 2008), 17 pages.
IPR2017-01450 Ex. 1023 U.S. Pat. No. 7,499,822, (Mar. 3, 2009), 38 pages.
IPR2017-01450 Ex. 1024 *DirecTV* vs. *Cable*, Wayback Archive of http://www.directv.com:80/DTVAPP/get_directv/directv_vs_cable.dsp, (Mar. 4, 2005), 2 pages.
IPR2017-01450 Ex. 1025 Patent Declaration Combined with Power of Attorney of U.S. Appl. No. 11/427,745, filed 2006, 4 pages.
IPR2017-01450 Ex. 1026 Definition of "phonograph", The American Heritage Desk Dictionary (2003 $4^{th}$ ed), 3 pages.
IPR2017-01450 Ex. 1027 Definition of "phonograph", Merriam-Webster's Collegiate Dictionary (2003 $4^{th}$ ed), 3 pages.
IPR2017-01450 Ex. 1028 "Stations Turn Off Analog Signals as Digital TV Deadline Arrives," New York Times, (Jun. 12, 2009), 16 pages.
IPR2017-01450 Ex. 1029 FCC Eleventh Annual Report, (Feb. 4, 2005), 151 pages.
Final Written Decision in IPR2017-01191 dated Oct. 11, 2018, 52 pages.
Final Written Decision in IPR2017-01450 dated Oct. 24, 2018, 47 pages.
Final Written Decision in IPR2017-00888 dated Sep. 20, 2018, 35 pages.
Adolphe V. Bemotas, "Computers and TV: Marriage of the Future; Five Star Lift Edition", St. Louis Post—Dispatch, Oct. 11, 1995, 1 page.
John Sweeney, "An Introduction to Interactive Television", International Broadcasting Convention, 1994, pp. 503-508.
Non-Final Office Action issued in U.S. Appl. No. 15/485,417 dated Dec. 14, 2018, 14 pages.

(56) References Cited

OTHER PUBLICATIONS

Final Office Action issued in 15/485,417 (2917-190US5) dated Apr. 18, 2019, 10 pp.

* cited by examiner

AUTOMATIC ON-DEMAND NAVIGATION BASED ON META-DATA BROADCAST WITH MEDIA CONTENT

This application is a continuation of application Ser. No. 14/947,017, filed on Nov. 20, 2015 (status pending), which is a continuation of application Ser. No. 14/167,509, filed on Jan. 29, 2014 (now U.S. Pat. No. 9,197,937), which is a continuation of application Ser. No. 13/456,813 (status abandoned), filed on Apr. 26, 2012. The above identified applications are incorporated by reference.

TECHNICAL FIELD

This disclosure relates to the field of automatic on-demand navigation.

BACKGROUND

A user who desires to consume (e.g., listen to, watch) particular on-demand media content (e.g., a song from an album, a particular music video) may use a communication device (e.g., set-top-box) to communicate with an on-demand system (e.g., a video-on-demand system) that has access to the media content and then searches or browses for the desired media content using menus provided by the on-demand system. After locating the desired media content, the user, through the communication device, instructs the on-demand system to transmit (e.g., stream) the desired media content to the user's communication device.

What is desired are systems and methods to make it easier for a user to consume on-demand media content.

SUMMARY

Embodiments of the present invention aim to enable a user to easily consume on demand content. In one aspect, a method is provided. In some embodiments, the method includes: (1) receiving meta-data that was received by a set-top-box from a head-end system; (2) in response to receiving the meta-data, obtaining information associated with the received meta-data; (3) displaying one or more on-demand options in response to obtaining the information associated with the meta-data; (4) receiving user input indicating a user of the communication device has selected one of the displayed on-demand options; and (5) in response to receiving the user input, causing the set-top-box to (i) tune to an on-demand channel or (ii) display an on-demand menu.

In some embodiments, the step of receiving the meta-data comprises receiving an audio watermark embedded in the audio data, wherein the audio watermark includes the meta-data; and decoding the audio watermark to extract the meta-data from the audio watermark. In other embodiments, the step of receiving the meta-data comprises receiving a visual watermark embedded in the video data, wherein the visual watermark includes the meta-data. In still other embodiments, the step of receiving the meta-data comprises receiving a message generated and transmitted by the set-top-box, wherein the message includes the meta-data.

In some embodiments, the step of causing the set-top-box to (i) tune to an on-demand channel or (ii) display an on-demand menu comprises transmitting to the head-end system a message comprising information for identifying the set-top-box, wherein the head-end system is configured such that, in response to receiving the message, the head-end system transmits to the set-top-box a command that causes the set-top-box to (i) tune to the on-demand channel or (ii) display the on-demand menu. The step of transmitting the message to the head-end system may consist of transmitting the message to an HTTP server that is a component of the head-end system. In some embodiments, the message further includes information identifying the on-demand option selected by the user and the head-end system is further configured such that, in response to receiving the message, the head-end system unicasts to the set-top-box a media content item associated with the selected on-demand option.

In another aspect, a communication device for enabling a user to initiate an on-demand session is disclosed. In some embodiments, the communication device includes: (1) a network interface receiving meta-data received by a set-top-box from a head-end system and output from the set-top-box (2) a data processing system. In some embodiments, the data processing system is configured to (i) use the meta-data to obtain information associated with the meta-data and (ii) display one or more on-demand options in response to obtaining the information associated with the meta-data. The data processing system is also operable to receive user input indicating that the user of the communication device has selected one of the displayed on-demand options, and the data processing system is further configured to cause the set-top-box to (i) tune to an on-demand channel or (ii) display an on-demand menu in response to receiving the user input. In some embodiments, the network interface receives the meta-data by receiving an audio signal output from a television speaker, and the meta-data is encoded in the audio signal. In other embodiments, the network interface receives the meta-data by receiving a video signal output from a television display, and the meta-data is encoded in the video signal. In yet other embodiments, the network interface receives the meta-data by receiving a message transmitted from the set-top-box.

In another aspect, a computer program product comprising a non-transitory computer readable medium storing an app operable to be executed by a communication device is disclosed. In some embodiments, the app includes: instructions for extracting meta-data from a signal output from a set-top-box; instructions for using the extracted meta-data to obtain information associated with the meta-data; instructions for displaying to a user of the communication device one or more on-demand options in response to obtaining the information associated with the meta-data; and instructions for causing the set-top-box to (i) tune to an on-demand channel or (ii) display an on-demand menu in response the user selecting one of the one or more on-demand options.

In still another aspect, a method performed by the head-end system is disclosed. In some embodiments, the method includes: (1) broadcasting, over a network, data comprising audio and/or video data (audio/video data) such that the audio/video data may be received simultaneously by a first STB and a second STB when both are tuned to the broadcast channel, the audio/video data corresponding to a particular media content item, wherein a user of the first STB has a communication device operable to: (i) receive meta-data output by the first STB, the meta-data being associated with the particular media content item, (ii) display to the user one or more on-demand options related to the particular media content item in response to receiving the meta-data, and (iii) transmit to the head-end system a message in response to the user selecting one of the on-demand options; (2) receiving from the communication device the message; and (3) in response to receiving the message, transmitting to the first STB a command that causes the first STB to (i) tune to an on-demand channel or (ii) display an on-demand menu.

The above and other aspects and embodiments are described below with reference to the accompanying drawings.

DETAILED DESCRIPTION

Figure 1:
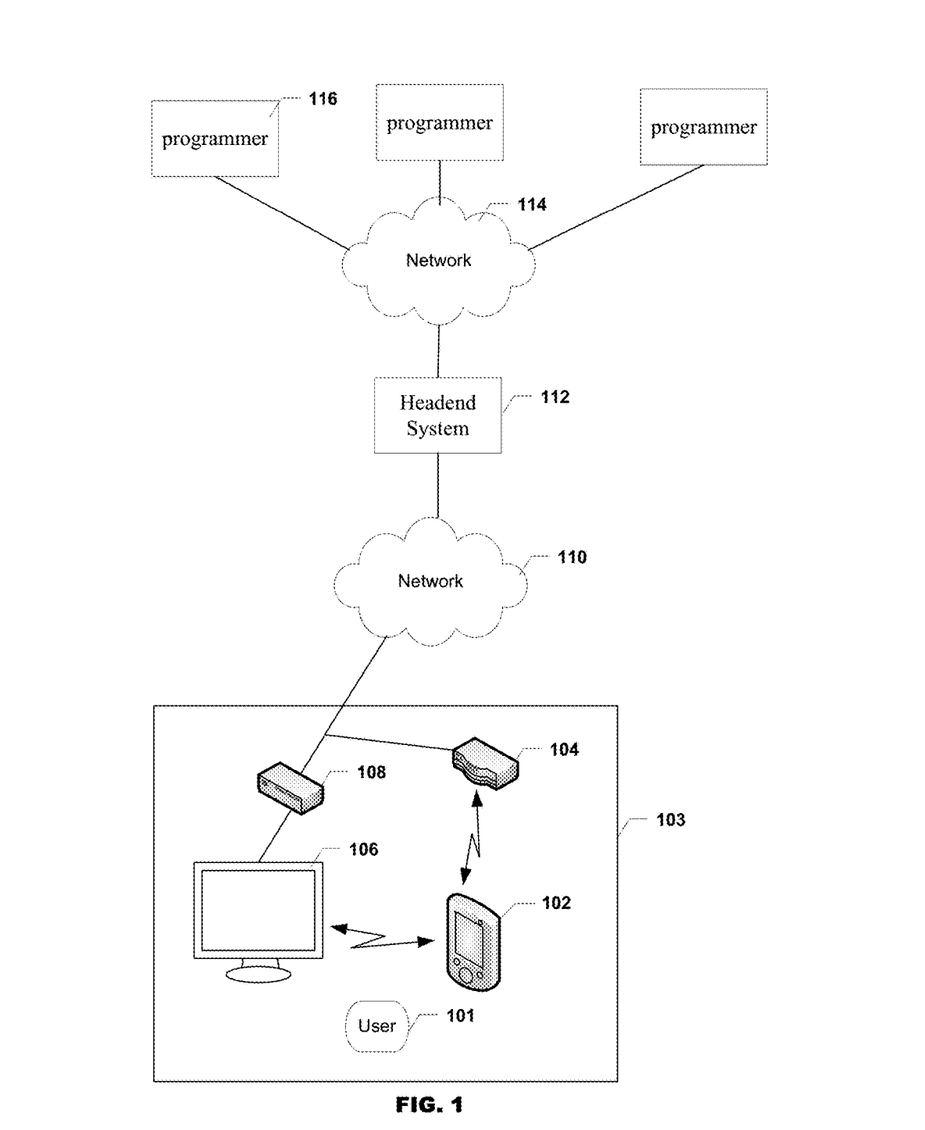
FIG. 1 illustrates an example system according to some embodiments that allows a user to easily consume on-demand media content.

FIG. 1 illustrates an example system 100, according to some embodiments, that allows a user 101 of system 100 to easily consume on-demand media content items (e.g., music videos, movies, TV shows). In the example shown, user 101 may be located within a room of a house 104 and user 101 is using television (TV) 106, which is located in the same room as user 101, to consume media content (e.g., user 101 may be watching a TV program transmitted over a broadcast TV channel). As also shown, user 101 is using a communication device 102, which is also located in the same room as TV 106. Communication device 102 may be a tablet computer (a.k.a., "media tablet"), a smartphone, a computer (e.g., a laptop), or other device capable of outputting information to user 101, receiving input from user 101, and communicating with other devices.

As shown in FIG. 1, house 103 may also include other communication devices, such as a set-top-box (STB) 108 and a wireless router 104. Communication devices 104 and 108 are shown as being connected to a network 110, which may be a network operated by a cable television provider (e.g., Verizon, Comcast, etc.) While STB 108 is shown as being separate and distinct from TV 106, this need not be the case. For example, TV 106 may itself have STB capabilities. Thus, when we refer herein to a "STB" or "set-top-box" we refer not only to conventional STBs, but also to any device that has STB capabilities (e.g., receiving and processing a signal received from network 110), such as a TV that has STB capabilities. Such devices are known in the art as "virtual STBs."

In the embodiment shown, a head-end system 112 may be connected to network 110. Head-end system 112 may receive, via a network 114 (e.g., a satellite network), signals transmitted by programmers 116. Head-end system 112 may process the received signals and broadcast (e.g., multicast) the resulting signals via network 110 so that the signals transmitted by head-end system 112 may be received and processed by a multitude of STBs connected to network 110.

Figure 2:
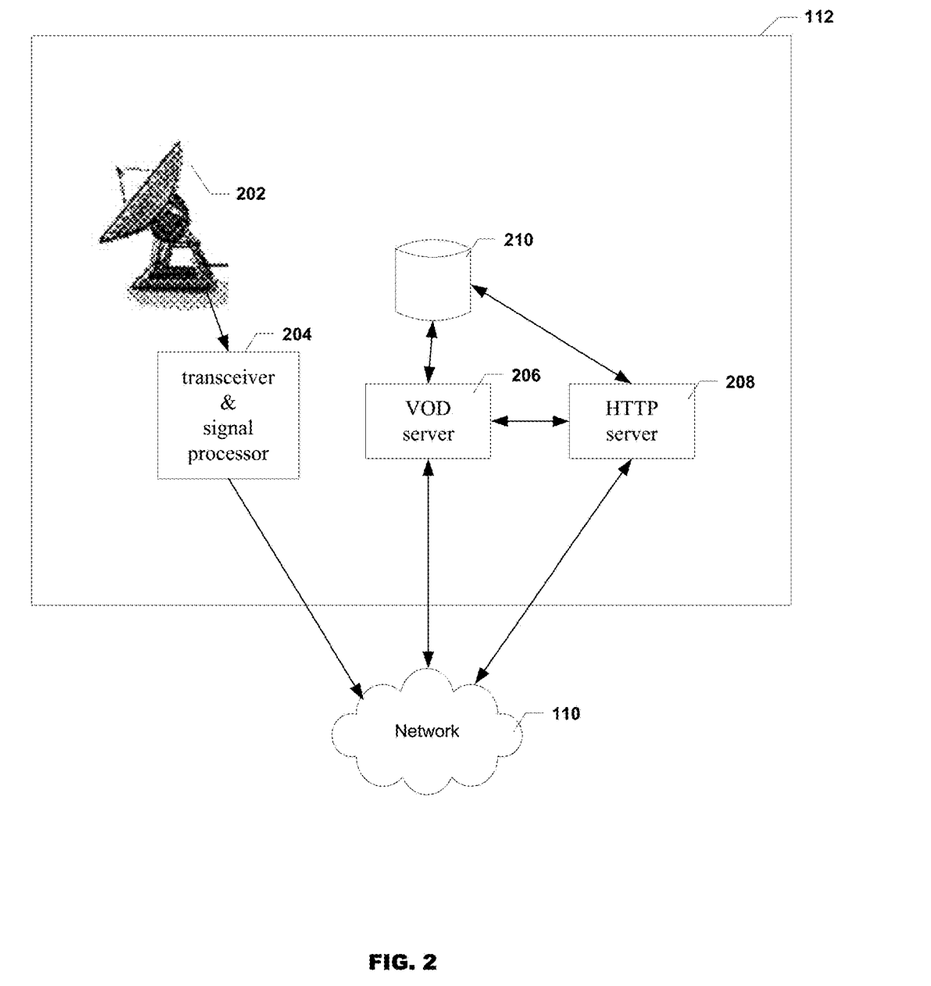
FIG. 2 further illustrates various components of an example head-end system.

FIG. 2 illustrates an example embodiment of head-end system 112. As shown, head-end system 112 may include a satellite dish 202 for receiving a signal containing programming transmitted by programmers 116. Coupled to dish 202 may be a transceiver and signal processor that receives a signal output from dish 202, decodes information included in the signal, recodes the information, and transmits via network 110 a signal containing the recoded information, which signal may be received by STB 108. Head-end system 112 may also include an on-demand server 206 and a hypertext transfer protocol (HTTP) server 208. Servers 206 and 208 may have access to a storage system 210, which may store on-demand media content items (e.g., video files, audio files).

Advantageously, in some embodiments, when user 101 is using TV 106 to consume a media content item, TV 106 may output a signal (an audio signal or video signal) containing meta-data associated with the media content item the user is consuming or the channel the user is watching. The meta-data may contain information identifying or otherwise associated with the media content item or channel. This signal containing the meta-data may be received by communication device 102 and processed by communication device 102 to extract the meta-data, which then may be used by communication device 102 to display one or more on-demand options to user 101. When user 101 selects one of the displayed on-demand options, communication device 102 may cause STB 108 to "tune" to a different channel than the channel to which STB 108 is currently tuned (e.g., it may cause STB 108 to "tune" to a particular on-demand channel over which the selected on-demand media content item is transmitted). In this manner, user 101 can easily consume on-demand media content items.

For example, if a particular app on communication device 102 is running while the signal is output by TV 106, then, in response to receiving the signal, the app may cause communication device 102 to send to a remote server (e.g., server 208 of head-end system 112) a request for information. The request may include an identifier (e.g., a string of characters) the app obtained from the meta-data included in the signal received from TV 106. For example, if the signal received from TV 106 is an audio watermark signal in which embedded therein is meta-data that identifies the media content item the user is currently consuming, the app may process the audio watermark to extract the meta-data. The server, in response to the request, may transmit information to communication device 102 (e.g., a list of available on-demand media content items), which then may display the information to user 101. User 101 may then select one of the listed media content items that is available for on-demand viewing. In response, communication device 102 may cause STB 108 to "tune" to a different channel than the channel to which STB 108 is currently tuned so that STB 108 will receive, process and output the selected media content item.

As used herein, the term "tuning to a channel" does not necessarily mean tuning in a frequency. This is so because TV channels may be, for example, transmitted using different multicast addresses or transmitted on different frequencies. In an IPTV environment, each available channel is typically transmitted using a multicast address specifically associated with the channel. Thus, when STB 108 "tunes" to a channel it may be tuning in the frequency over which the channel is transmitted or it may be joining a multicast group associated with the channel and processing data transmitted using the multicast address associated with the channel. In short, when we refer to a STB "tuning" in a channel, we mean that the STB receives the channel and outputs audio/video data from the channel to a display device so that the user can consume the channel.

Figure 3:
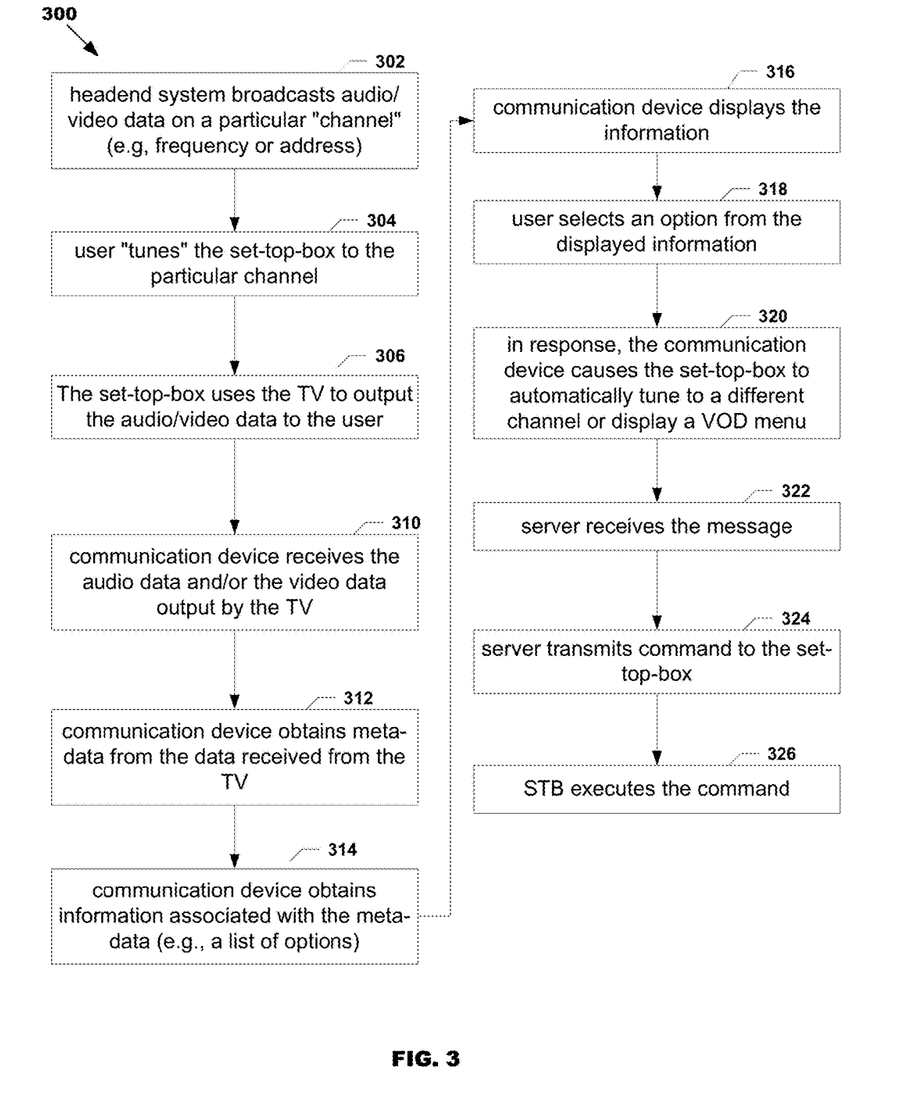
FIG. 3 is a flow chart illustrating a processes according to an embodiment.

FIG. 3 is a flow chart illustrating a process 300, according to some embodiments, for enabling a user 101 of system 100 to easily consume on-demand media content. Process 300 may begin in step 302 where head-end system 112 broadcasts audio/video data (e.g., a TV show) on a particular channel (e.g., a particular broadcast cable channel frequency or a particular multicast address). User 101 "tunes" STB 108 to the particular channel (step 304), which causes STB 108 to use TV 106 to output the audio/video data to user 101 (step 306). In step 310, communication device 102 receives the audio data and/or the video data output by TV 106, and, in step 312, communication device 102 obtains meta-data embedded in the received audio and/or video data.

For example, in step 310, communication device 102 may use a microphone 611 (see FIG. 5) to receive audio data (e.g., an audio watermark) that was output by TV 106, and encoded in the audio data may be the meta-data. Thus, in this embodiment, communicate device 102, in step 312, processes the audio data to extract the meta-data from the audio data. As another example, in step 310, communication device 102 may use a camera 612 (see FIG. 6) to receive video data (e.g., a QR code or other type of barcode) that was output by TV 106, and encoded in the video data may be the meta-data. Thus, in this embodiment, communicate device 102, in step 312, processes the video data to extract the meta-data from the video data.

In step 314, communication device 102 obtains information associated with the meta-data. Communication device 102 may obtain the information from a data storage system 606 (see FIG. 6) of communication device 102 or it may obtain the information from a remote server (e.g., server 208). In the embodiment where communication device 102 obtains the information from the remote server, communication device 102 obtains the information by transmitting to the remote server a request message (e.g., an HTTP GET message) that includes the meta-data with which the information is associated. In response to receiving the request message, the remote server uses the meta-data included in the message to (i) obtain from a data storage system (e.g., data storage system 210) information associated with the meta-data and (ii) transmit the obtained information to communication device 102. For example, the meta-data may be a primary key of a record in a relational table, which record stores the information or a pointer to the information.

In step 316, in response to obtaining the information associated with the meta-data, communication device 102 displays at least some of the information and one or more selectable items (e.g., one or more selectable graphic icons or text-links). Communication device may have a touch screen display 613 for displaying information to user 101. In step 318, user 101 selects one of the selectable items. In response, communication device 102 causes STB 108 to automatically tune to a different channel or display an on-demand menu (step 320).

In some embodiments, communication device 102 may perform step 320 by sending directly to STB 108 a command that causes STB 108 to tune to a different channel or display an on-demand menu. In other embodiments, communication device 102 may perform step 320 by sending a message to a remote server (e.g., server 206 or 208). The message may contain information identifying the address of STB 108 or information that enables the remote server to obtain the address of STB 108 (such as the IP address communication device 102). In such embodiments, the remote server receives the message and, in response, transmits to STB 108 a command that causes STB 108 to tune to a different channel or display an on-demand menu (steps 322, 324). Either way, in step 326, STB 108 responds to the command by tuning to another channel (e.g., an on-demand channel) or displaying an on-demand menu.

In above manner, user 101 can easily find on-demand content and initiate an on-demand session.

In some embodiments in which the communication device 102 sends to a remote server a message that contains information identifying the address of STB 108, the user may first configure the communication device so that it stores the address of STB 108. For example, when the user first runs the app mentioned above, the user may be prompted to input into communication device 102 the address of STB 108 (or an identifier associated with the address of STB 108) or the user may be prompted to cause the communication device to communicate with a remote server to download the address of the STB 108 to communication device 102.

Figure 4:
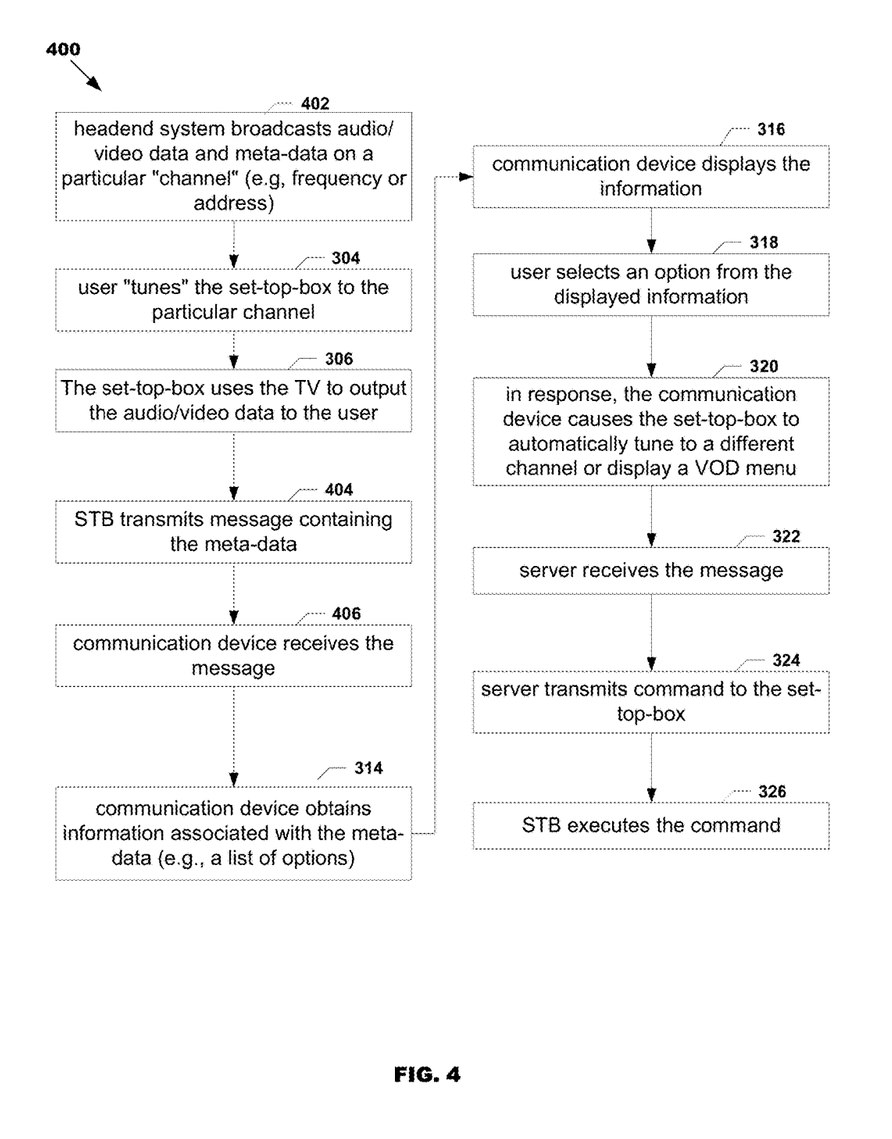
FIG. 4 is a flow chart illustrating a processes according to an embodiment.

FIG. 4 is a flow chart illustrating another process 400, according to some embodiments, for enabling a user 101 of system 100 to easily consume on-demand media content. Process 400 may begin in step 402 where head-end system 112 broadcasts audio/video data (e.g., a TV show) and text data (e.g., meta-data related to the TV show) on a particular channel (e.g., a particular broadcast cable channel frequency or a particular multicast address). User 101 "tunes" STB 108 to the particular channel (step 304), which causes STB 108 to use TV 106 to output the audio/video data to user 101 (step 306) and to process and/or store the text data. After step 304, STB 108 transmits to communication device 102 a message containing meta-data that was included in or derived from the received text data (step 404). In step 406, communication device 102 receives the message transmitted by STB 108, after which communication device performs steps 314-326 (described above).

Example Use Cases

Figure 5:
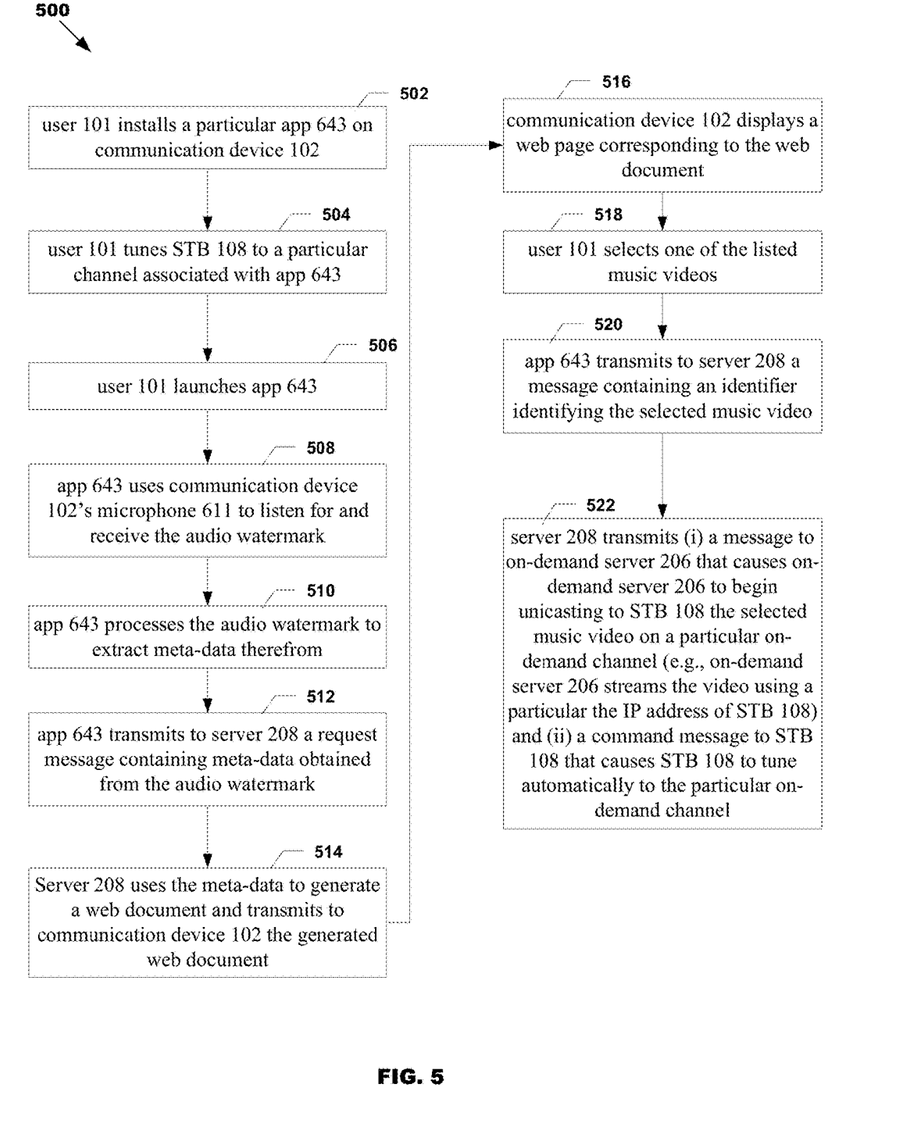
FIG. 5 is a flow chart illustrating an example use case.

FIG. 5 is a flow chart illustrating an example use case 500. Use case 500 may begin with user 101 installing a particular app 643 on communication device 102 (step 502). In step 504, user 101 tunes STB 108 to a particular channel associated with app 643. For example, we shall assume that app 643 is an app provided by or on behalf of Music Choice, and in step 504, user 101 tunes STB 108 to one of the music channels provided by Music Choice. In this example, we shall assume that Music Choice embeds in its music channel an audio watermark that identifies the song that is currently playing on the channel. For example, at any given time, the audio watermark embedded in the audio portion of the channel may contain track, title and artist information for the currently playing song. The audio watermark may also include other information, such as information identifying the music channel and/or the genre of the music channel.

In step 506, user 101 launches app 643. In step 508, app 643 uses communication device 102's microphone 611 (see FIG. 6) to listen for and receive the audio watermark. After receiving the audio watermark, app 643 processes the audio watermark to extract meta-data therefrom (e.g., the artist information and/or channel information contained in the watermark) (step 510).

In step 512, app 643 transmits to server 208 a request message (e.g., an HTTP Get request) containing meta-data obtained from the audio watermark. Server 208 responds by using the meta-data to generate a web document and transmitting to communication device 102 the generated web document (e.g., an HTML document) (step 514). For example, if we assume the meta-data includes the name of an artist, server 208 may use the artist's name to retrieve from a database (e.g., database 210) a list of music videos by the artist and include the list in an HTML template document, thereby creating the web document.

In step 516, communication device 102 displays a web page corresponding to the web document. In this example, the web page contains content associated with the meta-data (e.g., a list of music videos). In step 518, user 101 selects one of the listed music videos. In step 520, in response to the user selection, app 643 transmits to server 208 a message containing an identifier identifying the selected music video. In step 522, in response, server 208 transmits (i) a message to on-demand server 206 that causes on-demand server 206 to begin unicasting to STB 108 the selected music video on a particular on-demand channel (e.g., on-demand server 206 streams the video using a particular the IP address of STB 108) and (ii) a command message to STB 108 that causes STB 108 to tune automatically to the particular on-demand channel. Thus, in this way, user 101 is able to easily consume on-demand content.

In another use case, instead of performing step 522, server 208 may, in response to a message from app 643, send to STB 108 a command message that causes STB 108 to tune automatically to a linear channel identified in the command message. In another embodiment where STB 108 includes or is connected to a digital video recorder (DVR), server 208 may, in response to a message from app 643, send to STB 108 a command message that causes STB 108 to configure the DVR to record a particular channel identified in the command message at a particular date and time identified in the command message for a particular duration identified in the command message (e.g., the command message may instruct STB 108 to record channel 356 for two minutes starting at a certain time on a particular date).

Figure 6:
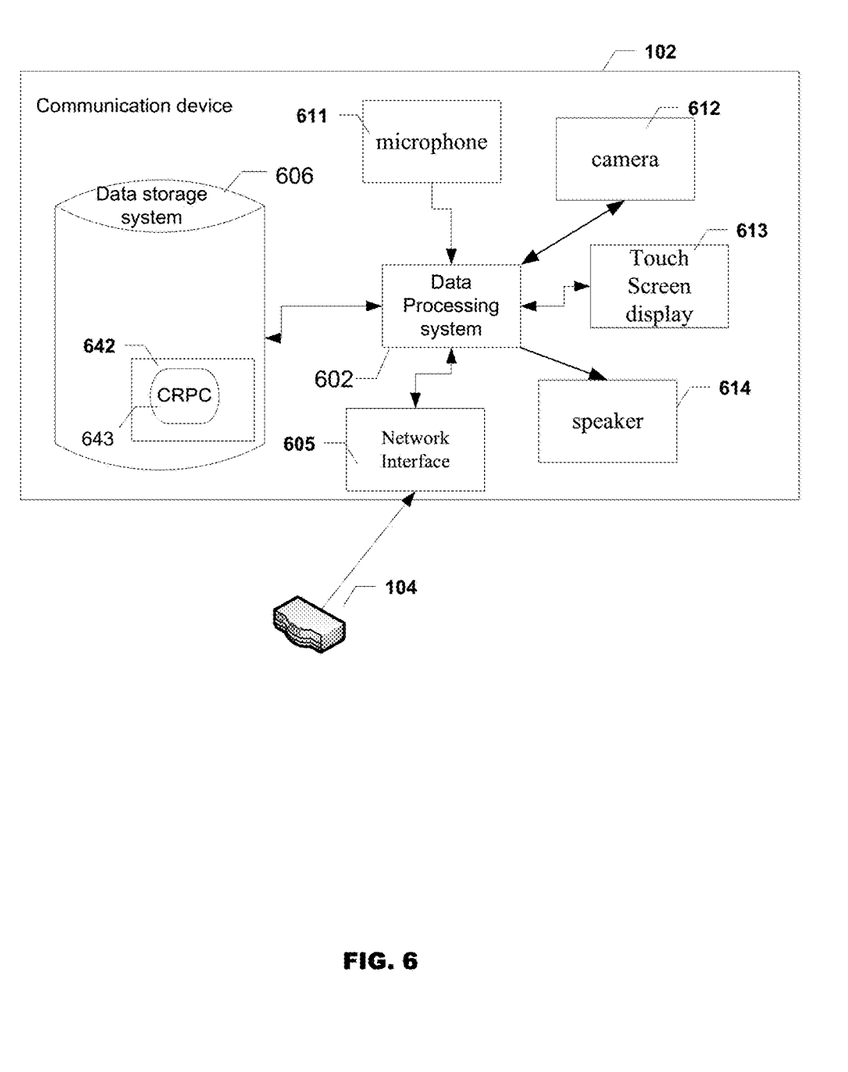
FIG. 6 is a block diagram of a particular embodiment of a communication device.

FIG. 6 illustrates a possible implementation for at least some components of communication device 102 according to some embodiments. As shown in FIG. 6, communication device 102 may include: (i) a data processing system 602, which may include one or more microprocessors and/or one or more circuits, such as an application specific integrated circuit (ASIC), Field-programmable gate arrays (FPGAs), etc; (ii) a network interface 605 for receiving messages (e.g., messages transmitted from device 104 or STB 108); (iii) a data storage system 606, which may include one or more computer-readable mediums, such as non-volatile storage devices and/or volatile storage devices (e.g., random access memory (RAM)); (iv) a microphone 611; (v) a camera 612; (vi) a touch screen display 613; and a (vii) speaker 614. Network interface 605, in some embodiments, includes or consists of a transmitter and a receiver. In embodiments where communication device is a mobile communication device (e.g., a smartphone), the network interface may further include an antenna for transmitting and receiving wireless signals.

In embodiments where data processing system 602 includes a microprocessor, a computer program product is provided, which computer program product includes: computer readable program code 643 (a.k.a., app 643) stored on a computer readable medium 642, such as, but not limited, to magnetic media (e.g., a hard disk), optical media (e.g., a DVD), memory devices (e.g., random access memory), etc. In some embodiments, app 643 is configured such that when executed by a processor, app 643 causes the processor to perform steps described above (e.g., certain steps describe above with reference to the flow charts shown in FIGS. 3, 4 and 5).

Figure 7:
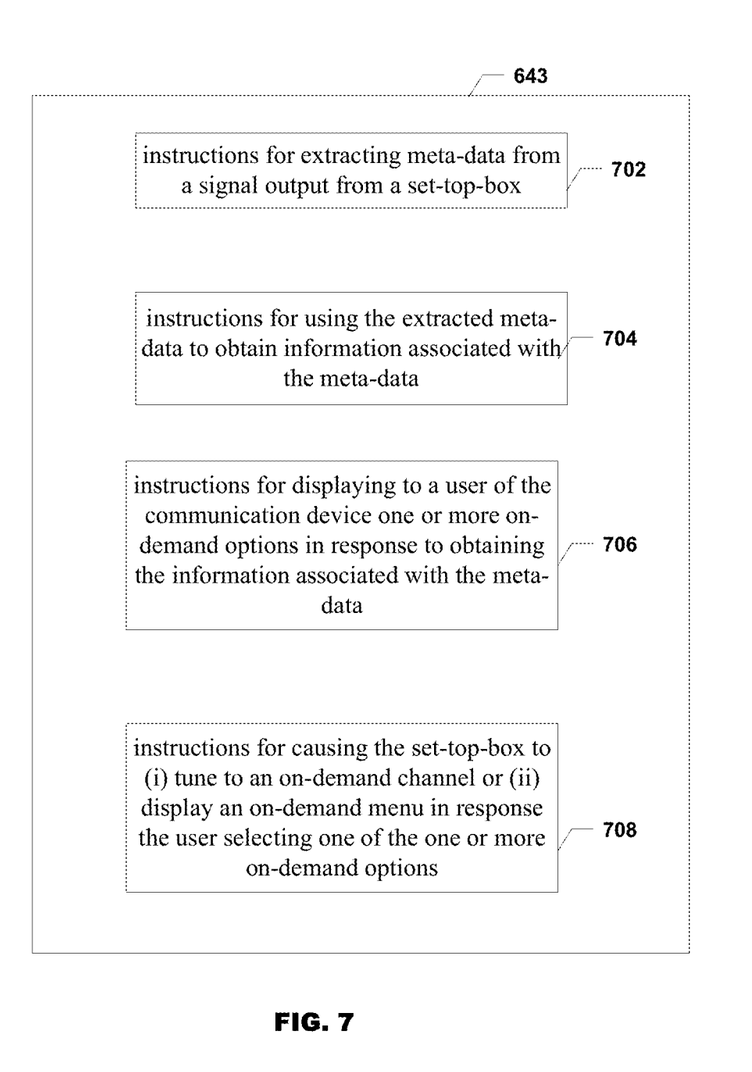
FIG. 7 illustrates components of an app according to some embodiments.

FIG. 7 illustrates an embodiment of app 643. In the embodiment shown, CRPC 643 includes: (1) a set of instructions 702 for extracting meta-data from a signal output from a set-top-box; (2) a set of instructions 704 for using the extracted meta-data to obtain information associated with the meta-data; (3) a set of instructions 706 for displaying to a user of the communication device one or more on-demand options in response to obtaining the information associated with the meta-data; and (4) a set of instructions 708 for causing the set-top-box to (i) tune to an on-demand channel or (ii) display an on-demand menu in response the user selecting one of the one or more on-demand options.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. In a system comprising: (a) a set-top-box receiving data broadcast from a remote head-end system comprising a server and (b) a communication device located near the set-top-box, wherein the data broadcast by the head-end system comprises audio and/or video data (audio/video data) corresponding to a particular media content item, a method performed by the communication device, comprising:

receiving, at the communication device, a music genre identifier transmitted by the set-top-box, wherein the set-top-box automatically transmitted the music genre identifier in response to receiving a signal containing the music genre identifier regardless of whether a user of the communication device has performed any operation;

in response to receiving the music genre identifier, the communication device obtaining information associated with the received music genre identifier, wherein obtaining the information associated with the received music genre identifier comprises the communication device transmitting to a server a request message comprising the music genre identifier and the communication device receiving from the server, in response to the request message, the information associated with the received music genre identifier, wherein the information associated with the received music genre identifier comprises a plurality of music video identifiers, wherein each of the plurality of music video identifiers identifies music video associated with the music genre identified by the music genre identifier;

the communication device displaying the plurality of music video identifier in response to obtaining the information associated with the music genre identifier;

the communication device receiving user input indicating a user of the communication device has selected one of the displayed music video identifiers; and the communication device causing the set-top-box to tune to an on-demand channel, which is not a linear channel, in response to receiving the user input indicating that the user has selected one of the music video identifiers displayed by the communication device, wherein the step of the communication device causing the set-top-box to tune to an on-demand channel comprises:

the communication device transmitting to the server of the remote head-end system a message comprising information for identifying the set-top-box and the selected music video identifier, wherein server is configured such that, in response to receiving the message, the server transmits to the set-top-box a command that causes the set-top-box to tune to the on-demand channel and unicasts to the set-top-box the music video identified by the selected music video identifier.

* * * * *